(12) United States Patent
Dhoolia et al.

(10) Patent No.: US 10,373,525 B2
(45) Date of Patent: Aug. 6, 2019

(54) INTEGRATED CURRICULUM BASED MATH PROBLEM GENERATION

(71) Applicant: International Business Machines Corporation, Armonk, NY (US)

(72) Inventors: Pankaj Dhoolia, Bangalore (IN); Monika Gupta, Bangalore (IN); Vibha S. Sinha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 14/867,511

(22) Filed: Sep. 28, 2015

(65) Prior Publication Data

US 2017/0092154 A1     Mar. 30, 2017

(51) Int. Cl.
  *G09B 23/02* (2006.01)
  *G09B 5/00* (2006.01)

(52) U.S. Cl.
  CPC ............. *G09B 23/02* (2013.01); *G09B 5/00* (2013.01)

(58) Field of Classification Search
  CPC .................................. G09B 23/02; G09B 5/00
  See application file for complete search history.

(56) References Cited

U.S. PATENT DOCUMENTS

| | | | | |
|---|---|---|---|---|
| 2003/0061201 | A1* | 3/2003 | Grefenstette | G06F 17/30011 |
| 2004/0229194 | A1* | 11/2004 | Yang | G09B 7/02 |
| | | | | 434/118 |
| 2005/0289168 | A1* | 12/2005 | Green | G06F 17/3064 |
| 2007/0111172 | A1 | 5/2007 | Kinard | |
| 2008/0301095 | A1* | 12/2008 | Zhu | G06F 17/30613 |
| 2009/0017427 | A1 | 1/2009 | Kunz et al. | |
| 2010/0228693 | A1* | 9/2010 | Dawson | G06F 17/2705 |
| | | | | 706/12 |

(Continued)

OTHER PUBLICATIONS

K. Sparck Jones, "Natural language processing: a historical review," Current Issues in Computational Linguistics: in Honour of Don Walker (Ed Zampolli, Calzolari and Palmer), Amsterdam: Kluwer, 1994 (Year: 1994).*

(Continued)

*Primary Examiner* — Eddy Saint-Vil
(74) *Attorney, Agent, or Firm* — Ryan, Mason & Lewis, LLP (57) ABSTRACT

Methods, systems, and computer program products for integrated curriculum based math problem generation are provided herein. A computer-implemented method includes generating a first map that represents a plurality of concepts pertaining to at least one subject matter area within a curriculum; generating a second map that represents a plurality of concepts pertaining to math word problems associated with the curriculum; determining portions of the first graph that exhibit a structural match to portions of the second graph; automatically creating a math word problem template by extracting multiple variable portions from one of the one or more math word problems associated with the curriculum; and automatically generating an integrated curriculum math word problem by replacing the multiple extracted variable portions in the template with concepts and relationships derived from the portions of the first graph that exhibit a structural match to the portions of the second graph.

19 Claims, 6 Drawing Sheets

(56) References Cited

U.S. PATENT DOCUMENTS

| | | | | |
|---|---|---|---|---|
| 2013/0212060 A1* | 8/2013 | Crouse | ............. | G06F 17/30563 707/602 |
| 2017/0084197 A1* | 3/2017 | Crouse | ................ | G09B 19/025 |

OTHER PUBLICATIONS

Concept Mapping, retrieved from the internet at https://www.niu.edu/facdev/_pdf/guide/strategies/concept_mapping.pdf (Year: 2012).*

GregTangMath, https://web.archive.org/web/20141120194507/http://gregtangmath.com/about, Nov. 20, 2014.

Automatic Factual Question Generation from Text, Michael Heilman, 2011, pp. 1-203, http://www.ark.cs.cmu.edu/mheilman/questions/papers/heilman-question-generation-dissertation.pdf.

Frykholm, J., & Glasson, G. (2005). Connecting science and mathematics instruction: Pedagogical context knowledge for teachers. School Science and Mathematics, 105 (3), 127-141.

The Mathematics and Science Integration Argument: A Stand for Teacher Education Joseph M. Furner and David D. Kumar, Eurasia Journal of Mathematics, Science & Technology Education, Eurasia Jounal of Mathematics, Science & Technology Education, 2007, 3(3), 185-189.

Margie Smeer, Microsoft Math Worksheet Generator, 2016, pp. 1-2, http://microsoft-math-worksheet-generator.software.informer.com/.

Wolfram Problem Generator, https://web.archive.org/web/20150629153315/http://www.wolframalpha.com/pro/problem-generator/, Jun. 29, 2015.

Khoury et al., A test problem generator for the Steiner problem in graphs, ACM Transactions on Mathematical Software (TOMS) vol. 19 Issue 4, Dec. 1993.

Hoffman et al., A Test Problem Generator for Discrete Linear L 1 Approximation Problems, ACM Transactions on Mathematical Software (TOMS), vol. 6 Issue 4, Dec. 1980.

Koirala et al., Preparing middle level preservice teachers to integrate mathematics and science: Problems and possibilities. School Science and Mathematics, 145(10), 145-154, 2003.

* cited by examiner

INTEGRATED CURRICULUM BASED MATH PROBLEM GENERATION

FIELD

The present application generally relates to information technology, and, more particularly, to automated educational techniques.

BACKGROUND

Word problems are a common primary tool used to enforce learning of a particular mathematical concept. However, manually creating such word problems can be a time-consuming and labor-intensive task, and the substantive breadth of such word problems is often narrow.

SUMMARY

In one embodiment of the present invention, techniques for integrated curriculum based math problem generation are provided. An exemplary computer-implemented method can include generating a first map, comprising (i) multiple nodes and (ii) multiple edges, that represents a plurality of concepts pertaining to at least one subject matter area within a curriculum. In such a first map, each one of the multiple nodes in the first map represents one of the plurality of concepts pertaining to the at least one subject matter area; each one of the multiple nodes in the first map comprises one or more attributes comprising at least one or more numerical values associated with the respective concept; and each one of the multiple edges in the first map represents a relationship between two or more of the multiple nodes in the first map. Additionally, the exemplary computer-implemented method can include generating a second map, comprising (i) multiple nodes and (ii) multiple edges, that represents a plurality of concepts pertaining to one or more math word problems associated with the curriculum In such a second map, each one of the multiple nodes in the second map represents one of the plurality of concepts pertaining to the one or more math word problems; and each one of the multiple edges in the second map represents a relationship between two or more of the multiple nodes in the second map. Also, the exemplary computer-implemented method can include determining one or more portions of the first graph that exhibit a structural match to one or more portions of the second graph, and automatically creating a math word problem template by extracting multiple variable portions from one of the one or more math word problems associated with the curriculum. Further, the exemplary computer-implemented method can include automatically generating an integrated curriculum math word problem by replacing the multiple extracted variable portions in the template with (i) one or more concepts and (ii) one or more relationships derived from the one or more portions of the first graph that exhibit a structural match to the one or more portions of the second graph.

In another embodiment of the invention, an exemplary computer-implemented method can include generating a first map, comprising (i) multiple nodes and (ii) multiple edges, that represents a plurality of concepts pertaining to at least one subject matter area within a curriculum. In such a first map, each one of the multiple nodes in the first map represents one of the plurality of concepts pertaining to the at least one subject matter area; each one of the multiple nodes in the first map comprises one or more attributes associated with the respective concept; and each one of the multiple edges in the first map represents a relationship between two or more of the multiple nodes in the first map. Additionally, the exemplary computer-implemented method can include generating a second map, comprising (i) multiple nodes and (ii) multiple edges, that represents a plurality of concepts pertaining to one or more math word problems associated with the curriculum. In such a second map, each one of the multiple nodes in the second map represents one of the plurality of concepts pertaining to the one or more math word problems; and each one of the multiple edges in the second map represents a relationship between two or more of the multiple nodes in the second map. Also, the exemplary computer-implemented method can include determining one or more portions of the first graph that exhibit a structural match to one or more portions of the second graph, and automatically creating a math word problem template by extracting multiple variable portions comprising at least one or more numerical values from one of the one or more math word problems associated with the curriculum. Further, the exemplary computer-implemented method can include automatically generating an integrated curriculum math word problem by: replacing the one or more numerical values in the template with one or more randomly selected numerical values that satisfy one or more constraints; and replacing each remaining extracted variable portion in the template with (i) one or more concepts and/or (ii) one or more relationships derived from the one or more portions of the first graph that exhibit a structural match to the one or more portions of the second graph.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the invention includes techniques for integrated curriculum based math problem generation. In contrast to existing word problem generation approaches, embodiments of the invention include automatically generating math word problems such that teachings from other subjects in a given curriculum can also be incorporated. Additionally, specific students can have an inclination and/or a dis-inclination towards one or more specific subjects. Accordingly, one or more embodiments of the invention can include generating and implementing word problems drawn from one or more subjects (for example, subjects that a given student does not like) so as to introduce the given student to concepts from the one or more subjects. In such an embodiment, the given student is exposed to concepts from both math and the one or more additional subjects via the generated word problems.

As detailed herein, at least one embodiment of the invention includes teaching multiple integrated concepts of two or more curricula by automatically generating math word problems that incorporate the multiple integrated concepts. Such an embodiment can include automatically extracting concepts and relationships from text in various subject sources materials (such as, for example, science materials, history materials, language materials, etc.) to create a curriculum concept map for each concept extracted. Additionally, sample concept maps and/or templates can be generated based on one or more math word problems provided as input. One or more embodiments of the invention can also include determining one or more structural similarities between one or more sample concept maps and one or more curriculum concept maps. As such, concept maps for different subjects can exhibit similarities, and "structural similarities" in this context refers to objects in two concept maps that have or express similar relationships between them.

Based on the determined structural similarities, at least one embodiment of the invention includes replacing one or more concepts in a sample word problem with one or more concepts from a curriculum concept map sharing a structural similarity. Additionally, such an embodiment includes identifying all numerical values from the concepts in the sample word problem to be replaced, and replacing those numerical values with associated numerical values from the curriculum concept map sharing a structural similarity. If no such replacement attributes are available, at least one embodiment of the invention includes selecting random values for replacing the noted numerical values from the concepts in the sample word problem such that the selected numerical values satisfy one or more additional constraints specified in a given curriculum or extracted from the sample problem. By way of illustrating a "constraint," as used herein, consider the following science concept example: "Chemical elements can be metals, non-metals or metalloids. The number of chemical elements is 118." In this example, a constraint enforced by the science concept is as follows: The number of elements=(the number of metals)+(the number of non-metals)+(the number of metalloids).

As used herein, a "concept map" refers to a graph with nodes representing entities and edges between the nodes representing relationships between the entities (nodes). Each node in the graph can have one or more attributes (such as a numerical value, for example) associated therewith. Also, as used herein, a "sample math problem" refers to a math word problems which is used as an example and/or template of a word problem to be generated. Derivation and/or generation of the sample math problems can be carried out in via one of multiple mechanisms. In one embodiment of the invention, a user specifies the science and/or social concept and provides a sample math word problem. The system thereafter generates new math word problems using the given science and/or social concept and follows the template prescribed by the given sample math word problem. In another embodiment of the invention, a user specifies a science and/or social concept and the math scope (such as "addition", "ratio," etc.). The system then generates new math word problems using the given science and/or social concept and can follow one or more existing pre-defined templates (stored in a system database) for generating new math word problems.

Figure 1:
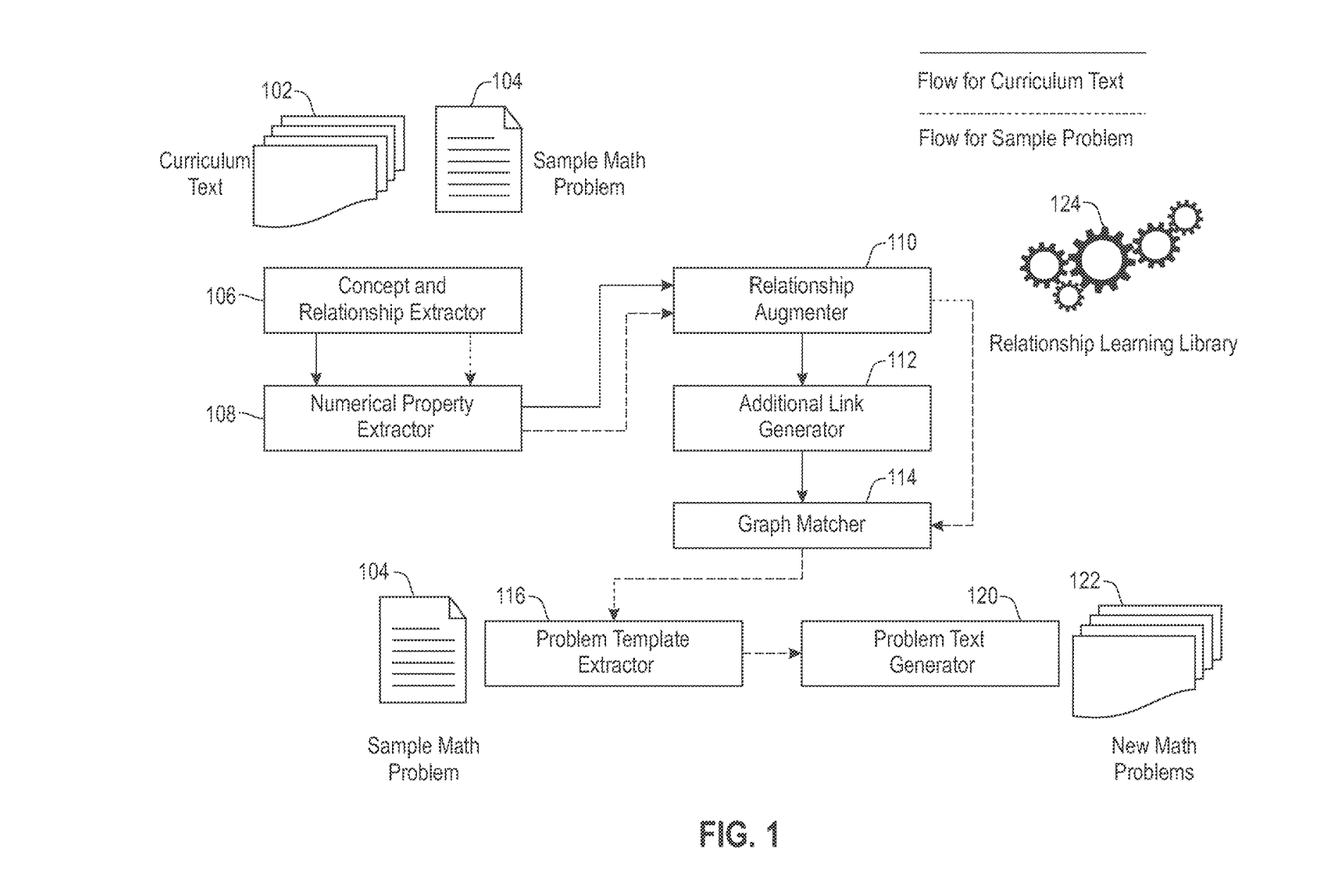
FIG. 1 is a diagram illustrating system architecture, according to an example embodiment of the invention.

FIG. 1 is a diagram illustrating system architecture, according to an embodiment of the invention. By way of illustration, FIG. 1 depicts curriculum text sources 102 and sample math problem sources 104, which are input to a concept and relationship extractor component 106. In one or more embodiments of the invention, a database of curriculum text sources can be created using student math, science, language, and/or social studies curriculum books for different grades. The concept and relationship extractor component 106 extracts concepts and relationships between entities and/or concepts from curriculum text in sources 102 and from sample math problems from sources 104 via implementation of an algorithm to extract entities and/or keywords and relationships between entities and/or keywords from text sources (such as 102 and 104). One or more embodiments of the invention can include implementing one or more natural language parsing tools to identify noun objects and verbs from natural language sentences (wherein noun objects are denoted as entities and verbs are denoted as relationships). Further, by way of illustration, "instance-of," "succeeds," and "precedes" are example relationships that can be identified in sample math problems.

Also, in one or more embodiments of the invention, each concept in a curriculum concept map can be enhanced with information derived from external sources such as Internet sources and knowledge databases. Also, from each sample math problem, at least one embodiment of the invention includes, in conjunction with extracting a concept map, inferring a type associated with the problem (such as, for example, an addition problem, a chart or graph problem, a percentage problem, a ratio problem, etc.). A problem type determination can be based, for example, on rules defined pertaining to the presence of specific text in sample problems.

The concepts and relationships extracted from curriculum text in sources 102 and from sample math problems from sources 104 is output from the concept and relationship extractor component 106 and provided to numerical property extractor component 108, which extracts one or more numerical properties from the concepts and relationships and outputs the numerical properties to a relationship augmenter component 110. As used herein, "numerical properties" refer to numerical values associated with certain entities or a relationship therebetween. The relationship augmenter component 110, as also depicted in FIG. 1, utilizes information derived from a relationship learning library 124. The relationship learning library 124 can include dictionaries and/or learning models to map specific relationship words to other generic relationships.

The relationship augmenter component 110 augments and/or enhances the extracted relationships with a predefined taxonomy of relationships. Such a taxonomy can be incrementally created for each new math concept type to be introduced. Also, the relationship learning library 124 can contain pluggable modules (dictionaries or learning models) that map discrete relationship words to a class in the relationship taxonomy. As such, the relationship augmenter component 110 provides curriculum-related input (augmented input) to an additional link generator component 112, while providing sample problem-related input (augmented input) to a graph matcher component 114. Entities (nouns) and relationships (verbs) extracted by components 106, 108 and 110 form the above-noted inputs. The additional link generator component 112 then provides curriculum-related input to the graph matcher component 114. For the given input and output, the link generator component 112 creates additional links associated with the curriculum-related input. These links help invoke student's curiosity to learn more on some specific related concepts. The graph matcher component 114 determines and/or identifies structural similarities and/or matches between the curriculum-related input and the sample problem-related input (for example, by identifying one or more sub-graphs in a curriculum graph that structurally match the math problem graph), and outputs such similarities and/or matches to a problem template extractor component 116, which derives information from at least one sample math problem 104. Additionally, one or more embodiments of the invention include storing each graph in a database (DB) and using graph queries to identify matching sub-graphs.

The problem template extractor component 116 provides an extracted problem template to a problem text generator component 120. As detailed herein, the extractor component 116 can implement one or more natural language parsing tools to identify noun objects (entities) and verbs (relationships) from natural language sentences. By way of example, input provided by the at least one sample math problem 104 can include the following sample problem:

User A saved $300 in the month of March and saved $460 in the month of April. What is the percentage increase in User A's savings from March to April?

As such, the extracted template (extracted by component 116) might include, for example:

<Entity> <relationship> <number> <instance> and <number> in the <instance>. What is the percentage increase in <instance> to <instance>?

Referring back to FIG. 1, the problem text generator component 120 generates one or more new math problems 122 that incorporate aspects of one or more other subject matter curricula. Specifically, in one or more embodiments of the invention, the problem text generator component replaces variable portions in the template extracted by component 116 with matched curriculum (sub-graph) concepts and properties/attributes.

As illustrated, FIG. 1 also depicts the flow of curriculum-related text and/or information via bolded/straight lines/arrows, and depicts the flow of sample problem-related text and/or information via dashed lines/arrows.

Additionally, at least one embodiment of the invention (such as the example embodiment depicted in FIG. 1) can include generating new math problems (for example, via the steps and components illustrated in FIG. 1) on a server, wherein the generated math problems are subsequently transmitted to a (student) client device for display and completion via a graphical interface on the (student) client device.

Figure 2:
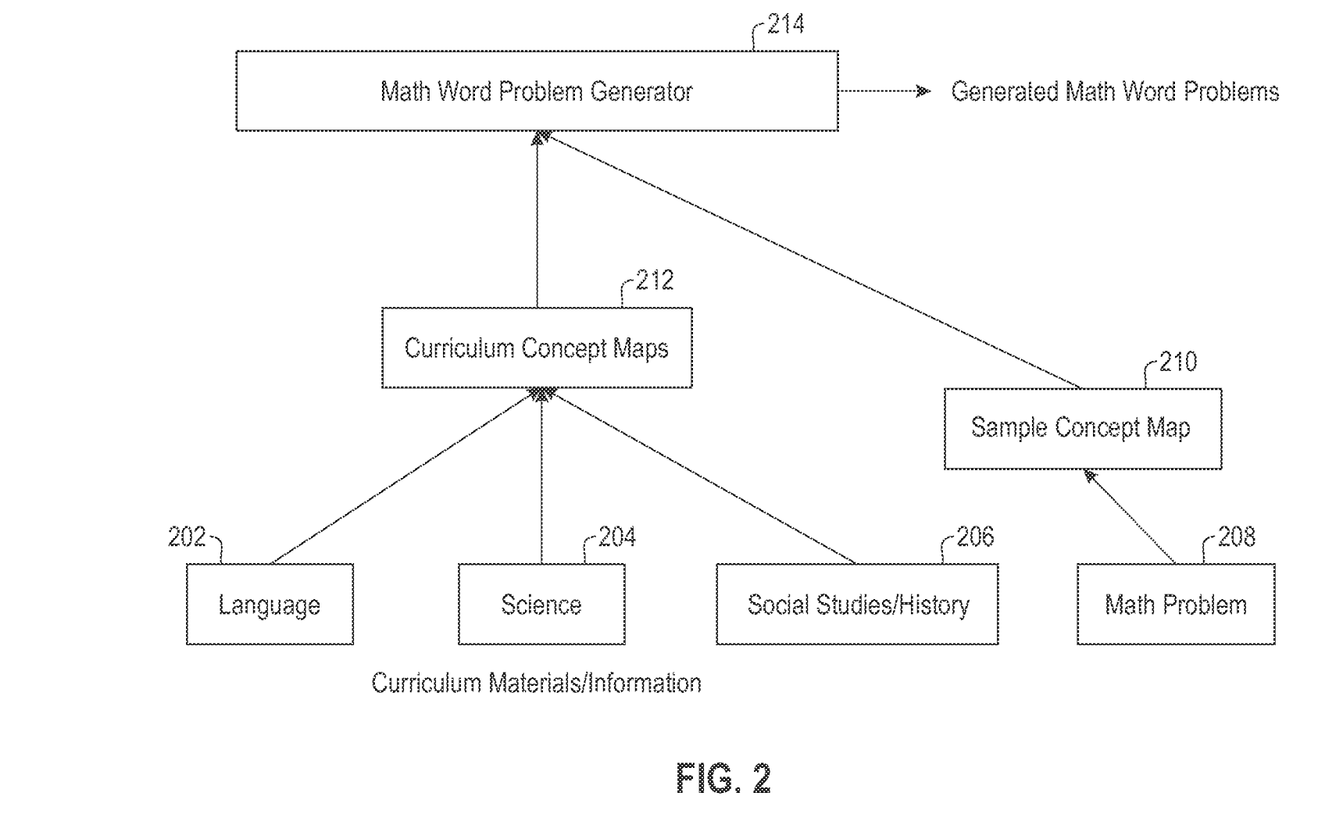
FIG. 2 is a diagram illustrating system architecture, according to an embodiment of the invention.

FIG. 2 is a diagram illustrating system architecture, according to an embodiment of the invention. By way of illustration, FIG. 2 depicts various subject matter curriculum materials and/or information such as, for example, language curriculum materials 202, science curriculum materials 204, and social studies/history curriculum materials 206. As detailed herein, the subject matter curriculum materials (such as 202, 204 and 206) are utilized to generate curriculum concept maps 212. Additionally, FIG. 2 depicts a sample math problem 208, which is utilized to generate a sample concept map 210.

Further, as described herein, the curriculum concept maps 212 and the sample concept map 210 are leveraged by a math word problem generator 214 to generate math word problems that incorporate aspects of one or more of the various subject matter curricula.

Figure 3A:
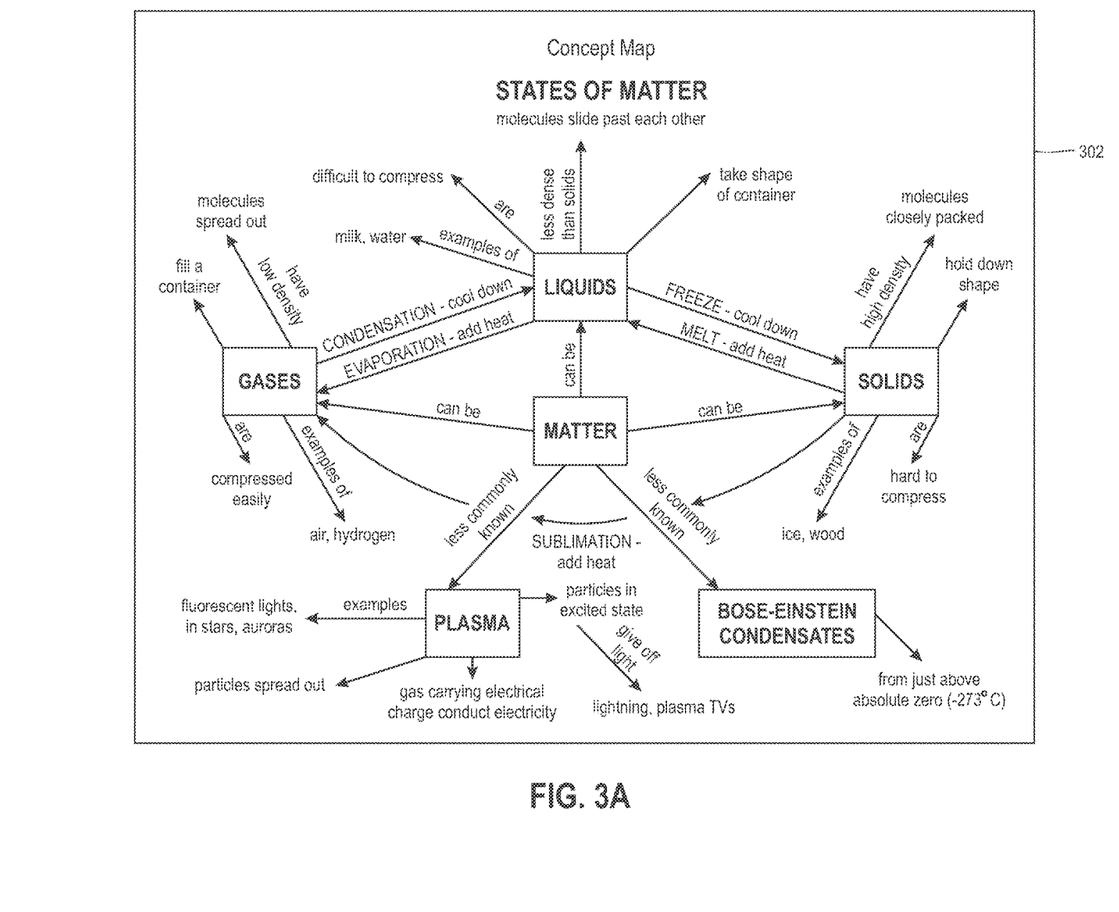
FIG. 3A is a diagram illustrating an example of a concept map for an example science class, according to an example embodiment of the invention.

FIG. 3A is a diagram illustrating an example of a concept map 302 for an example science class, according to an example embodiment of the invention. Specifically, the example concept map 302 depicted in FIG. 3A details subject matter pertaining to states of matter, with various entities, relationships between such entities, and properties/attributes associated with each entity identified therein.

Figure 3B:
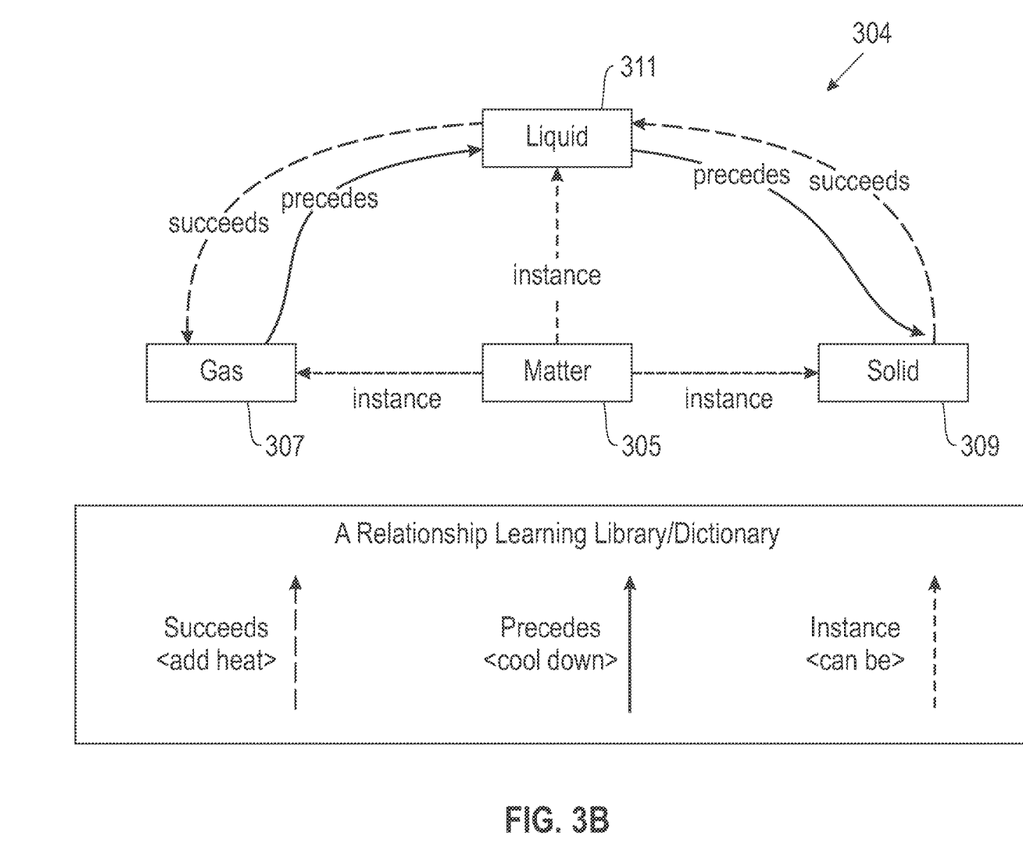
FIG. 3B is a diagram illustrating an augmented version of the example concept map in FIG. 3A, according to an example embodiment of the invention.

FIG. 3B is a diagram illustrating an augmented version 304 of the example concept map 302 in FIG. 3A, according to an example embodiment of the invention. Specifically, the augmented version 304 highlights entities of matter 305, gas 307, solid 309, and liquid 311, and also includes specific relationships therebetween. Namely, the relationships highlighted in augmented map 304 include "succeeds (via the implementation of heat)," "precedes (via cooling down)," and an identifying "instance" (that is, a first entity in question "can be" a second entity in question).

By way merely of illustration, consider the following example implementations of one or more embodiments of the invention. In one example, sample input can include the scientific concept of: "On heating water in a pot, evaporation occurs and the amount of water in the pot decreases." Further, in this example, the mathematical concept to be taught is percentages. Accordingly, an output of an example embodiment of the invention can include the following generated mathematical word problem: "On heating water in a pot, evaporation occurs and amount of water in the pot decreases from 500 ml to 350 ml. What percentage of water has evaporated?"

In another example, sample input can include the following text from a geography curriculum source text: "Important rulers of the Mughal Empire include Babur (1526-1530), Humayun (1530-1540 and 1555-1556), Akbar (1556-1605), Jahangir (1605-1627) and Shah Jahan (1627-1658)." Also, in this example, a sample math problem includes: "Student A completed her homework between 3:00 PM and 4:45 PM. Student B completed her homework between 4:00 PM and 5:10 PM. Student C completed her homework between 4:20 PM and 7:10 PM. Draw a bar graph showing the time taken by each of Student A, Student B, and Student C to complete his or her homework." Accordingly, an output of an example embodiment of the invention can include the following generated mathematical word problem: "Important rulers of the Mughal Empire include Babur (1526-1530), Humayun (1530-1540 and 1555-1556), Akbar (1556-1605), Jahangir (1605-1627) and Shah Jahan (1627-1658). Draw a bar graph showing the reigning time-period for each of the noted Mughal rulers."

In another example, sample input can include the following sample math problem: "User A has a monthly income of $5000. User A's monthly expenditures equal $3600, and the balance of the monthly income is considered savings. What is the ratio of User A's expenditures to his savings?" Also, in this example, sample input can include the following text from a science curriculum source: "There are 118 different known elements (that is, substances made exclusively from one type of atom). Out of the 118 elements, 92 occur naturally on Earth, and the rest are generated synthetically." Accordingly, an output of an example embodiment of the invention can include the following generated mathematical word problem: "There are 118 different known elements (that is, substances made exclusively from one type of atom). Out of the 118 elements, 92 occur naturally on Earth, and the rest are generated synthetically. What is the ratio of elements occurring naturally to elements that are generated synthetically?"

Figure 4:
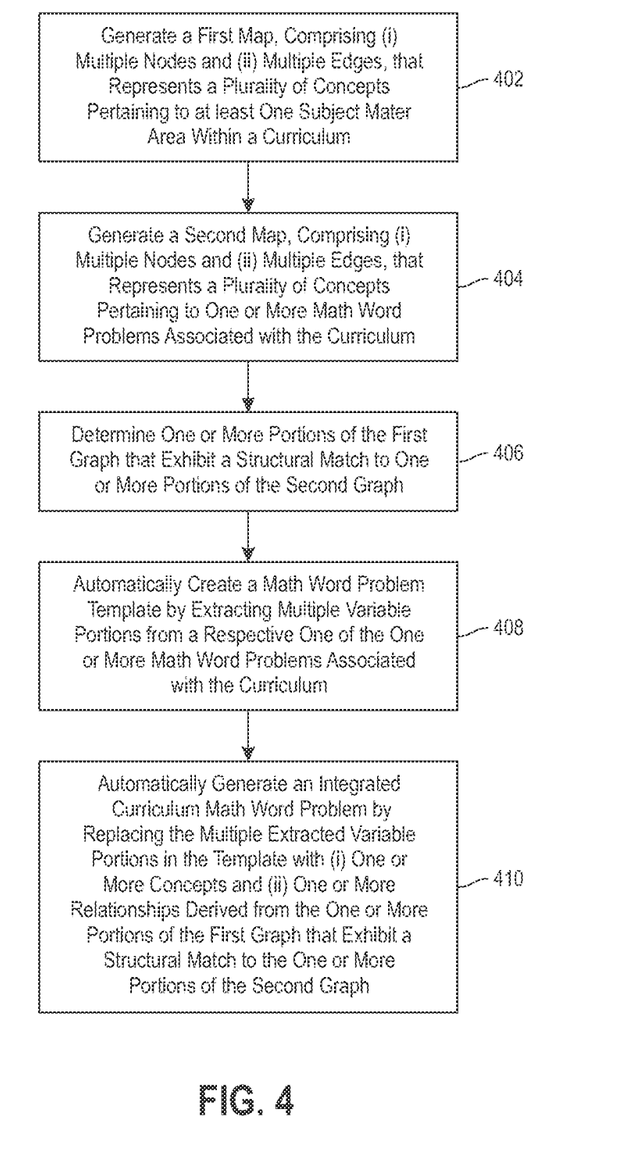
FIG. 4 is a flow diagram illustrating techniques according to an embodiment of the invention.

FIG. 4 is a flow diagram illustrating techniques according to an embodiment of the present invention. Step 402 includes generating a first map, comprising (i) multiple nodes and (ii) multiple edges, that represents a plurality of concepts pertaining to at least one subject matter area within a curriculum, wherein said generating the first map is carried out by at least one computing device communicatively linked to an electronic source of materials associated with the curriculum. In the first map, each one of the multiple nodes in the first map represents one of the plurality of concepts pertaining to the at least one subject matter area; each one of the multiple nodes in the first map comprises one or more attributes comprising at least one or more numerical values associated with the respective concept; and each one of the multiple edges in the first map represents a relationship between two or more of the multiple nodes in the first map.

Generating the first map can include extracting the plurality of concepts pertaining to the at least one subject matter area within a curriculum from the electronic source of materials associated with the curriculum. Such extracting can include implementing an algorithm to extract instances of one or more entities and/or one or more keywords from the electronic source of materials associated with the curriculum. Generating the first map can also include extracting the multiple relationships from the electronic source of materials associated with the curriculum. Such an embodiment of the invention can also include augmenting the multiple relationships with one or more additional relationships derived from a pre-defined taxonomy of relationships, wherein augmenting can include mapping one or more pre-determined relationship words to a class in the pre-defined taxonomy.

Additionally, generating the first map can include determining the one or more attributes associated with each one of the multiple nodes in the first map from the electronic source of materials associated with the curriculum. One or more embodiments of the invention can also include augmenting the one or more attributes associated with each one of the multiple nodes in the first map with one or more items of information derived from an Internet source.

Step 404 includes generating a second map, comprising (i) multiple nodes and (ii) multiple edges, that represents a plurality of concepts pertaining to one or more math word problems associated with the curriculum, wherein said generating the second map is carried out by the at least one computing device communicatively linked to an electronic source of math word problems associated with the curriculum. In the second map, each one of the multiple nodes in the second map represents one of the plurality of concepts pertaining to the one or more math word problems; and each one of the multiple edges in the second map represents a relationship between two or more of the multiple nodes in the second map.

At least one embodiment of the invention can additionally include storing the first graph and the second graph in a database.

Step 406 includes determining one or more portions of the first graph that exhibit a structural match to one or more portions of the second graph, wherein said determining is carried out by the at least one computing device.

Step 408 includes automatically creating a math word problem template by extracting multiple variable portions from one of the one or more math word problems associated with the curriculum, wherein said automatically creating is carried out by the at least one computing device. In at least one embodiment of the invention, the multiple variable portions can include an instance of an entity, an instance of a relationship, and/or an instance of a numerical value.

Step 410 includes automatically generating an integrated curriculum math word problem by replacing the multiple extracted variable portions in the template with (i) one or more concepts and (ii) one or more relationships derived from the one or more portions of the first graph that exhibit a structural match to the one or more portions of the second graph, wherein said automatically generating is carried out by the at least one computing device.

The techniques depicted in FIG. 4 can also include determining at least one type, selected from a set of multiple types, of problem that categorizes each of the one or more math word problems associated with the curriculum. Such determining can include applying one or more rules defined based on a presence of one or more pre-determined words and/or one or more pre-determined phrases in each of the one or more math word problems associated with the curriculum.

Additionally, the techniques depicted in FIG. 4 can include supplementing the integrated curriculum math word problem with one or more items of supplemental information pertaining to the one or more concepts and/or the one or more relationships derived from the one or more portions of the first graph that exhibit a structural match to the one or more portions of the second graph. Further, one or more embodiments of the invention can include selecting the at least one subject matter area within the curriculum based on one or more objectives, wherein the one or more objectives can include student performance in the at least one subject matter area.

Also, an additional embodiment of the invention includes generating a first map, comprising (i) multiple nodes and (ii) multiple edges, that represents a plurality of concepts pertaining to at least one subject matter area within a curriculum, wherein said generating the first map is carried out by at least one computing device communicatively linked to an electronic source of materials associated with the curriculum. In the first map, each one of the multiple nodes in the first map represents one of the plurality of concepts pertaining to the at least one subject matter area; each one of the multiple nodes in the first map comprises one or more attributes associated with the respective concept; and each one of the multiple edges in the first map represents a relationship between two or more of the multiple nodes in the first map.

The additional embodiment of the invention can also include generating a second map, comprising (i) multiple nodes and (ii) multiple edges, that represents a plurality of concepts pertaining to one or more math word problems associated with the curriculum, wherein said generating the second map is carried out by the at least one computing device communicatively linked to an electronic source of math word problems associated with the curriculum. In the second map, each one of the multiple nodes in the second map represents one of the plurality of concepts pertaining to the one or more math word problems; and each one of the multiple edges in the second map represents a relationship between two or more of the multiple nodes in the second map.

Also, the additional embodiment of the invention can include determining one or more portions of the first graph that exhibit a structural match to one or more portions of the second graph, wherein said determining is carried out by the at least one computing device, and automatically creating a math word problem template by extracting multiple variable portions comprising at least one or more numerical values from one of the one or more math word problems associated with the curriculum, wherein said automatically creating is carried out by the at least one computing device.

Further, the additional embodiment of the invention can additionally include automatically generating an integrated curriculum math word problem by: replacing the one or more numerical values in the template with one or more randomly selected numerical values that satisfy one or more constraints; and replacing each remaining extracted variable portion in the template with (i) one or more concepts and/or (ii) one or more relationships derived from the one or more portions of the first graph that exhibit a structural match to the one or more portions of the second graph, wherein said automatically generating is carried out by the at least one computing device. The one or more constraints can include one or more constraints specified in the curriculum and/or one or more constraints extracted from the one of the one or more math word problems associated with the curriculum.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
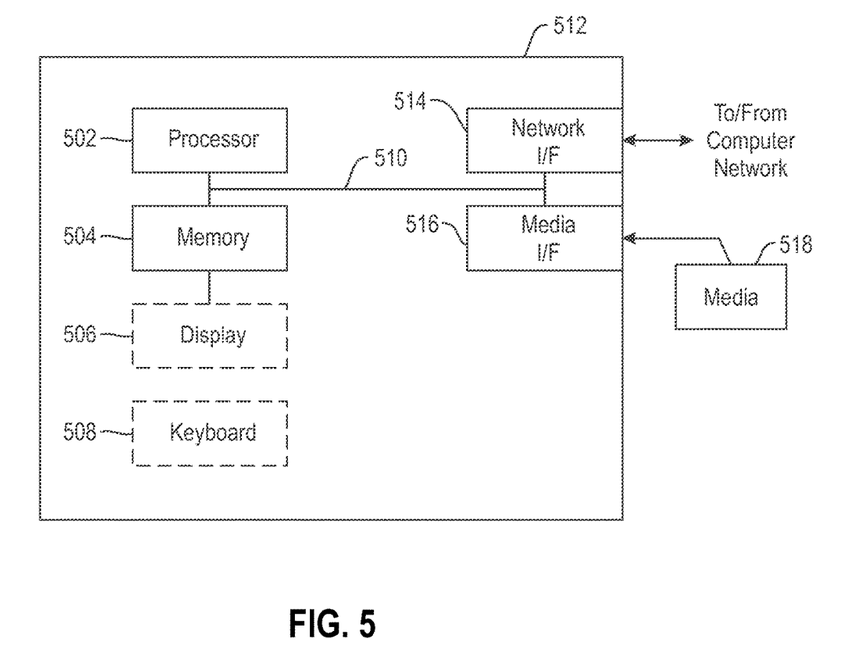
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, teaching various integrated concepts of curriculum topics by automatically generating math word problems with respect to the curriculum concepts. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   generating a first map, comprising (i) multiple nodes and (ii) multiple edges, that represents a plurality of concepts pertaining to multiple non-mathematic subject matter areas within a curriculum, wherein said generating the first map is carried out by at least one computing device communicatively linked to an electronic source of materials associated with the curriculum, wherein said generating the first map comprises automatically extracting instances of one or more entities and one or more keywords from data structures within the electronic source of materials, and wherein:
   each one of the multiple nodes in the first map represents one of the plurality of concepts pertaining to the multiple non-mathematic subject matter areas;
   each one of the multiple nodes in the first map comprises one or more attributes comprising at least one or more numerical values associated with the respective concept; and
   each one of the multiple edges in the first map represents a relationship between two or more of the multiple nodes in the first map;
   generating a second map, comprising (i) multiple nodes and (ii) multiple edges, that represents a plurality of concepts pertaining to one or more math word problems associated with the curriculum, wherein said generating the second map is carried out by the at least one computing device communicatively linked to an electronic source of math word problems associated with the curriculum, and wherein:
   each one of the multiple nodes in the second map represents one of the plurality of concepts pertaining to the one or more math word problems; and
   each one of the multiple edges in the second map represents a relationship between two or more of the multiple nodes in the second map;
   determining one or more portions of the first map that exhibit a structural match to one or more portions of the second map, wherein said determining is carried out by the at least one computing device;
   automatically creating a math word problem template by extracting multiple variable portions from one of the one or more math word problems associated with the curriculum, wherein said automatically creating is carried out by the at least one computing device; and
   automatically generating an integrated curriculum math word problem by replacing the multiple extracted variable portions in the template with (i) one or more concepts and (ii) one or more relationships derived from the one or more portions of the first map that exhibit a structural match to the one or more portions of the second map, wherein said replacing comprises satisfying one or more subject matter-specific constraints attributed to the one or more of the multiple non-mathematic subject matter areas of the first map, and wherein said automatically generating is carried out by the at least one computing device.

2. The method of claim 1, wherein said generating the first map comprises extracting the plurality of concepts pertaining to the multiple non-mathematic subject matter areas within the curriculum from the electronic source of materials associated with the curriculum.

3. The method of claim 1, wherein said generating the first map comprises extracting the multiple relationships from the electronic source of materials associated with the curriculum.

4. The method of claim 3, comprising:
   augmenting the multiple relationships with one or more additional relationships derived from a pre-defined taxonomy of relationships.

5. The method of claim 4, wherein said augmenting comprises mapping one or more pre-determined relationship words to a class in the pre-defined taxonomy.

6. The method of claim 1, wherein said generating the first map comprises determining the one or more attributes associated with each one of the multiple nodes in the first map from the electronic source of materials associated with the curriculum.

7. The method of claim 6, comprising:
   augmenting the one or more attributes associated with each one of the multiple nodes in the first map with one or more items of information derived from an Internet source.

8. The method of claim 1, comprising:
   determining at least one type, selected from a set of multiple types, of problem that categorizes each of the one or more math word problems associated with the curriculum.

9. The method of claim 8, wherein said determining the at least one type comprises applying one or more rules defined based on a presence of one or more pre-determined words and/or one or more pre-determined phrases in each of the one or more math word problems associated with the curriculum.

10. The method of claim 1, wherein the multiple variable portions comprise an instance of an entity, an instance of a relationship, and/or an instance of a numerical value.

11. The method of claim 1, comprising:
supplementing the integrated curriculum math word problem with one or more items of supplemental information pertaining to the one or more concepts and/or the one or more relationships derived from the one or more portions of the first map that exhibit a structural match to the one or more portions of the second map.

12. The method of claim 1, comprising:
selecting the multiple non-mathematic subject matter areas within the curriculum based on one or more objectives.

13. The method of claim 12, wherein the one or more objectives comprise student performance in the multiple non-mathematic subject matter areas.

14. The method of claim 1, comprising:
storing the first map and the second map in a database.

15. A computer program product, the computer program product comprising a computer readable storage medium having program instructions embodied therewith, the program instructions executable by a device to cause the device to:
generate a first map, comprising (i) multiple nodes and (ii) multiple edges, that represents a plurality of concepts pertaining to multiple non-mathematic subject matter areas within a curriculum, wherein said generating the first map comprises automatically extracting instances of one or more entities and one or more keywords from data structures within an electronic source of materials associated with the curriculum, and wherein:
each one of the multiple nodes in the first map represents one of the plurality of concepts pertaining to the multiple non-mathematic subject matter areas;
each one of the multiple nodes in the first map comprises one or more attributes comprising at least one or more numerical values associated with the respective concept; and
each one of the multiple edges in the first map represents a relationship between two or more of the multiple nodes in the first map;
generate a second map, comprising (i) multiple nodes and (ii) multiple edges, that represents a plurality of concepts pertaining to one or more math word problems associated with the curriculum, wherein:
each one of the multiple nodes in the second map represents one of the plurality of concepts pertaining to the one or more math word problems; and
each one of the multiple edges in the second map represents a relationship between two or more of the multiple nodes in the second map;
determine one or more portions of the first map that exhibit a structural match to one or more portions of the second map;
automatically create a math word problem template by extracting multiple variable portions from one of the one or more math word problems associated with the curriculum; and
automatically generate an integrated curriculum math word problem by replacing the multiple extracted variable portions in the template with (i) one or more concepts and (ii) one or more relationships derived from the one or more portions of the first map that exhibit a structural match to the one or more portions of the second map, wherein said replacing comprises satisfying one or more subject matter-specific constraints attributed to the one or more of the multiple non-mathematic subject matter areas of the first map.

16. A system comprising:
a memory; and
at least one processor coupled to the memory and configured for:
generating a first map, comprising (i) multiple nodes and (ii) multiple edges, that represents a plurality of concepts pertaining to multiple non-mathematic subject matter areas within a curriculum, wherein said generating the first map comprises automatically extracting instances of one or more entities and one or more keywords from data structures within an electronic source of materials associated with the curriculum, and wherein:
each one of the multiple nodes in the first map represents one of the plurality of concepts pertaining to the multiple non-mathematic subject matter areas;
each one of the multiple nodes in the first map comprises one or more attributes comprising at least one or more numerical values associated with the respective concept; and
each one of the multiple edges in the first map represents a relationship between two or more of the multiple nodes in the first map;
generating a second map, comprising (i) multiple nodes and (ii) multiple edges, that represents a plurality of concepts pertaining to one or more math word problems associated with the curriculum, wherein:
each one of the multiple nodes in the second map represents one of the plurality of concepts pertaining to the one or more math word problems; and
each one of the multiple edges in the second map represents a relationship between two or more of the multiple nodes in the second map;
determining one or more portions of the first map that exhibit a structural match to one or more portions of the second map;
automatically creating a math word problem template by extracting multiple variable portions from one of the one or more math word problems associated with the curriculum; and
automatically generating an integrated curriculum math word problem by replacing the multiple extracted variable portions in the template with (i) one or more concepts and (ii) one or more relationships derived from the one or more portions of the first map that exhibit a structural match to the one or more portions of the second map, wherein said replacing comprises satisfying one or more subject matter-specific constraints attributed to the one or more of the multiple non-mathematic subject matter areas of the first map.

17. A computer-implemented method, comprising:
generating a first map, comprising (i) multiple nodes and (ii) multiple edges, that represents a plurality of concepts pertaining to multiple non-mathematic subject matter areas within a curriculum, wherein said generating the first map is carried out by at least one computing device communicatively linked to an electronic source of materials associated with the curriculum, wherein said generating the first map comprises automatically extracting instances of one or more entities and one or more keywords from data structures within the electronic source of materials, and wherein:
- each one of the multiple nodes in the first map represents one of the plurality of concepts pertaining to the multiple non-mathematic subject matter areas;
- each one of the multiple nodes in the first map comprises one or more attributes associated with the respective concept; and
- each one of the multiple edges in the first map represents a relationship between two or more of the multiple nodes in the first map;

generating a second map, comprising (i) multiple nodes and (ii) multiple edges, that represents a plurality of concepts pertaining to one or more math word problems associated with the curriculum, wherein said generating the second map is carried out by the at least one computing device communicatively linked to an electronic source of math word problems associated with the curriculum, and wherein:
- each one of the multiple nodes in the second map represents one of the plurality of concepts pertaining to the one or more math word problems; and
- each one of the multiple edges in the second map represents a relationship between two or more of the multiple nodes in the second map;

determining one or more portions of the first map that exhibit a structural match to one or more portions of the second map, wherein said determining is carried out by the at least one computing device;

automatically creating a math word problem template by extracting multiple variable portions comprising at least one or more numerical values from one of the one or more math word problems associated with the curriculum, wherein said automatically creating is carried out by the at least one computing device; and automatically generating an integrated curriculum math word problem by:
- replacing the one or more numerical values in the template with one or more randomly selected numerical values that satisfy one or more subject matter-specific constraints attributed to the one or more of the multiple non-mathematic subject matter areas of the first map; and
- replacing one or more of the extracted variable portions in the template with (i) one or more concepts and/or (ii) one or more relationships derived from the one or more portions of the first map that exhibit a structural match to the one or more portions of the second map, wherein said automatically generating is carried out by the at least one computing device.

18. The method of claim 17, wherein the one or more constraints comprise one or more constraints specified in the curriculum.

19. The method of claim 17, wherein the one or more constraints comprise one or more constraints extracted from the one of the one or more math word problems associated with the curriculum.

* * * * *